(12) United States Patent
Wallace et al.

(10) Patent No.: US 8,611,592 B2
(45) Date of Patent: Dec. 17, 2013

(54) LANDMARK IDENTIFICATION USING METADATA

(75) Inventors: Alexander David Wallace, Sunnyvale, CA (US); Tim Cherna, San Francisco, CA (US); Eric Hanson, Emeryville, CA (US); Nikhil Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 619 days.

(21) Appl. No.: 12/868,653

(22) Filed: Aug. 25, 2010

(65) Prior Publication Data
US 2011/0052073 A1    Mar. 3, 2011

Related U.S. Application Data

(60) Provisional application No. 61/237,225, filed on Aug. 26, 2009.

(51) Int. Cl.
*G06K 9/00*    (2006.01)

(52) U.S. Cl.
USPC ............ 382/103; 382/106; 382/181; 382/305

(58) Field of Classification Search
USPC .................................. 382/103, 106, 181, 305
See application file for complete search history.

(56) References Cited

U.S. PATENT DOCUMENTS

| | | | | |
|---|---|---|---|---|
| 7,698,336 B2 * | 4/2010 | Nath | | 707/737 |
| 8,238,671 B1 * | 8/2012 | Babenko et al. | | 382/224 |
| 8,238,693 B2 * | 8/2012 | Nurminen et al. | | 382/286 |
| 8,321,395 B2 * | 11/2012 | Wallace et al. | | 707/705 |
| 8,364,393 B2 * | 1/2013 | DeLuca et al. | | 701/409 |
| 8,385,593 B2 * | 2/2013 | Urbach et al. | | 382/100 |
| 8,401,785 B2 * | 3/2013 | Cho et al. | | 701/426 |
| 8,433,707 B2 * | 4/2013 | Wallace et al. | | 707/732 |
| 8,447,136 B2 * | 5/2013 | Ofek et al. | | 382/284 |
| 8,464,182 B2 * | 6/2013 | Blumenberg et al. | | 715/863 |
| 8,467,991 B2 * | 6/2013 | Khosravy et al. | | 702/153 |
| 2005/0104976 A1 * | 5/2005 | Currans | | 348/231.5 |
| 2005/0185060 A1 * | 8/2005 | Neven | | 348/211.2 |
| 2006/0002590 A1 * | 1/2006 | Borak | | 382/104 |
| 2008/0069449 A1 | 3/2008 | Cho et al. | | |
| 2008/0140638 A1 * | 6/2008 | Bruno | | 707/4 |
| 2008/0147730 A1 * | 6/2008 | Lee et al. | | 707/104.1 |
| 2008/0268876 A1 * | 10/2008 | Gelfand et al. | | 455/457 |
| 2008/0320036 A1 * | 12/2008 | Winter | | 707/103 R |
| 2009/0324058 A1 * | 12/2009 | Sandage et al. | | 382/154 |

(Continued)

OTHER PUBLICATIONS

Tsai et al., "Extent: Inferring Image Metadata from Context and Content", Department of Electrical & Computer Engineering and Computer Science, UC Santa Barbara, IEEE 2005, 4 pages.

(Continued)

*Primary Examiner* — Aaron W Carter
(74) *Attorney, Agent, or Firm* — Wong, Cabello, Lutsch, Rutherford & Brucculeri, LLP (57) ABSTRACT

Methods, systems, and apparatus are presented for associating a point of interest with a captured image. In one aspect, metadata associated with a digital image can be accessed, the metadata identifying an image capture location. Further, a depth of field corresponding to the digital image can be determined and one or more points of interest can be identified that are located within the determined depth of field. Additionally, one of the one or more identified points of interest can be selected as an image subject and the metadata associated with the digital image can be edited to include data identifying the selected point of interest.

32 Claims, 6 Drawing Sheets

(56) References Cited

U.S. PATENT DOCUMENTS

| | | | |
|---|---|---|---|
| 2009/0324103 A1* | 12/2009 | Gelfand et al. | 382/224 |
| 2010/0176987 A1* | 7/2010 | Hoshizaki | 342/357.02 |
| 2010/0265177 A1* | 10/2010 | Fujimoto et al. | 345/162 |
| 2010/0290699 A1* | 11/2010 | Adam et al. | 382/155 |
| 2011/0052073 A1* | 3/2011 | Wallace et al. | 382/190 |
| 2011/0055283 A1 | 3/2011 | Wallace et al. | |
| 2011/0055284 A1 | 3/2011 | Wallace et al. | |
| 2011/0064312 A1* | 3/2011 | Janky et al. | 382/195 |
| 2011/0254861 A1* | 10/2011 | Emura et al. | 345/633 |
| 2011/0273471 A1* | 11/2011 | Nagasaka et al. | 345/619 |
| 2011/0311140 A1* | 12/2011 | Urbach et al. | 382/182 |
| 2012/0020565 A1* | 1/2012 | Urbach et al. | 382/182 |
| 2012/0105581 A1* | 5/2012 | Berestov et al. | 348/43 |
| 2012/0121195 A1* | 5/2012 | Yadid et al. | 382/229 |
| 2012/0206619 A1* | 8/2012 | Nitta et al. | 348/222.1 |
| 2012/0230539 A1* | 9/2012 | Calman et al. | 382/103 |
| 2012/0323930 A1* | 12/2012 | Kennberg et al. | 707/748 |
| 2013/0018881 A1* | 1/2013 | Bhatt | 707/736 |
| 2013/0191725 A1* | 7/2013 | Meadow et al. | 715/234 |
| 2013/0195363 A1* | 8/2013 | Janky et al. | 382/195 |
| 2013/0201340 A1* | 8/2013 | Meadow et al. | 348/159 |
| 2013/0201341 A1* | 8/2013 | Meadow et al. | 348/159 |

OTHER PUBLICATIONS

Wang et al., "Method and Apparatus for Geo-named Object Identification", IP.com Prior Art Database, IPCOM000134145D, Feb. 24, 2006, 8 pages.

* cited by examiner

LANDMARK IDENTIFICATION USING METADATA

CROSS REFERENCE TO RELATED APPLICATIONS

This specification claims priority under 35 U.S.C. §119(e) to U.S. Provisional Application No. 61/237,225 entitled "Landmark Identification Using Metadata" and filed Aug. 26, 2009, the entire disclosure of which is incorporated herein by reference.

TECHNICAL FIELD

The present disclosure relates to identifying a point of interest included in an image based on the location at which an image is captured, and to using metadata associated with the image in performing the identifying.

BACKGROUND

Images can contain a vast amount of visual information. However, the visual information typically does not convey many of the details associated with capturing the image. Therefore, text-based image metadata can be recorded and stored along with an image, such as in an image file header. Image metadata is structured data that describes characteristics of an image. Further, because the image metadata is text-based, it can be used to easily identify and manage images When an image is captured, image metadata also can be captured, such as by a processor included in the image capture device. The captured image metadata can include generic information as well as camera-manufacturer specific information. Each item of metadata is known as a property and describes a particular characteristic associated with the image. A property can describe any characteristic that can be ascertained and expressed textually or numerically. For example, properties can include the time and date of capture, the location of capture, dimensions of the image, and one or more technical settings or values relating to the image capture device.

Further, image metadata can be organized in a data structure, such as a list or an array. As a result, the image metadata can be accessed and processed by a computer. In some instances, image metadata can be organized hierarchically, so that one or more items of metadata are categorized under one or more other items. In other instances, image metadata can be organized using a single-level list of related and/or unrelated properties. Additionally, image metadata can be expressed as attribute-value pairs.

Numerous standards have been developed for organizing metadata associated with photographs. For example, the International Press Telecommunications Council (IPTC) created the IPTC Photo Metadata definition, which can be used to describe and administrate photographs. IPTC Photo Metadata groups image metadata into categories relating to administrative, descriptive, and rights related properties. Further, the Japan Electronic Industries Development Association created the Exchangeable image file format (Exif) specification that defines an image file format for use by digital cameras. The Exif standard incorporates metadata tags relating to a wide variety of properties including camera settings, date and time information, copyright information, and a thumbnail.

Once image metadata has been generated and stored in association with an image, the metadata remains with that image. For example, the image metadata can be transferred or copied when the corresponding image is transferred or copied. Image metadata also can be automatically or manually edited. For example, an existing property can be altered or deleted if it is incorrect. Further, new metadata can be appended to the metadata associated with an image file. Thus, metadata that was not available to the image capture device at the time of capture nonetheless can be associated with the image.

SUMMARY

Metadata associated with an image can be used to identify a landmark or other such point of interest that represents a likely subject of the image. Image metadata identifying a location at which an image was captured, e.g. Global Positioning System (GPS) coordinates, can be used to determine one or more candidate points of interest. Further, one or more additional items of image metadata can be used to constrain the set of candidate points of interest. The image metadata can be captured contemporaneously with the corresponding image, or can be associated with the image at a later time.

The present inventors recognized a need to automatically identify a likely subject of an image, based on the location at which the image was captured, to assist with image identification and management. Further, the need to edit image metadata to reflect an identified subject also was recognized. For example, the need to append metadata identifying a subject to the metadata associated with an image was recognized.

The present inventors also recognized the need to use one or more additional items of image metadata to reduce the number of candidate points of interest and to increase the confidence that the correct point of interest is identified. For example, the need to identify a focal region of the image capture device at the time the image was taken, e.g. based on either or both of a lens used and a focal distance, was recognized. Also, the present inventors recognized the need to generate or narrow the set of candidate points of interest based on the identified focal region. Additionally, the present inventors recognized the need to determine a compass bearing corresponding to the image capture device at the time of image capture, and to exclude from the set of candidate points of interest any points of interest located outside of the image capture device's field of view.

Further, the present inventors recognized the need to utilize metadata generated by an accelerometer to determine an orientation of the image capture device at the time of image capture. The present inventors also recognized the need to exclude from the set of candidate points of interest any points of interest located outside of the image capture device's field of view based on the determined orientation. Additionally, the present inventors recognized the need to account for topography and structures that could obscure, at least partially, one or more candidate points of interest from the field of view of the image capture device. The need to exclude from the set of candidate points of interest any obscured points also was recognized. Accordingly, the techniques and apparatus described here implement algorithms for identifying one or more points of interest likely to be a subject of the captured image.

In general, in one aspect, the techniques can be implemented to include accessing metadata associated with a digital image, the metadata identifying an image capture location, determining a depth of field corresponding to the digital image, identifying one or more points of interest located within the determined depth of field, selecting one of the one or more identified points of interest as an image subject, and editing the metadata associated with the digital image to include data identifying the selected point of interest.

The techniques also can be implemented such that the metadata identifying an image capture location includes a Global Positioning System (GPS) coordinate. Further, the techniques can be implemented such that determining a depth of field further includes accessing metadata identifying a subject distance, a focal length, and an f-stop corresponding to the digital image. Determining a depth of field can include accessing metadata identifying a sensor type corresponding to the digital image (full frame, 1.3 crop, 1.5 crop, 1.6 crop, and the like). Additionally, the techniques can be implemented to include selecting one of the one or more identified points of interest based on proximity to the image capture location.

The techniques also can be implemented to include submitting a request specifying the image capture location and determined depth of field to a database including point of interest data and receiving a response from the database including one or more identified points of interest. Further, the techniques can be implemented to include accessing metadata associated with the digital image, the metadata identifying a compass heading and determining, based at least in part on the compass heading, a horizontal field of view corresponding to the digital image. Additionally, the techniques can be implemented such that identifying one or more points of interest further includes excluding points of interest located outside of the determined horizontal field of view.

In general, in another aspect, the techniques can be implemented to include accessing metadata associated with a digital image, the metadata identifying an image capture location and a compass heading, determining a depth of field corresponding to the digital image, determining a field of view corresponding to the digital image based on the determined depth of field and the compass heading, identifying one or more points of interest located within the determined field of view, selecting one of the one or more identified points of interest as an image subject, and associating the selected point of interest with the digital image.

The techniques also can be implemented to include accessing metadata identifying an orientation value corresponding to the digital image. The orientation value can be captured using a gyroscope. Metadata identifying a focus point value corresponding to the digital image can be accessed. Further, the techniques can be implemented such that determining a field of view further includes determining a vertical angle of view based on the orientation value and adjusting the determined field of view in accordance with the determined vertical angle of view. Additionally, the techniques can be implemented such that identifying one or more points of interest further includes submitting a query to a database of point of interest data, the query specifying the determined field of view and receiving, in response to the query, a set of one or more identified points of interest.

The techniques also can be implemented to include excluding a point of interest from the set of one or more identified points of interest in response to identifying a blocking structure located between the image capture location and the point of interest. Further, the techniques can be implemented such that determining a depth of field further includes accessing metadata identifying a subject distance, a focal length, and an f-stop corresponding to the digital image. Additionally, the techniques can be implemented such that determining a depth of field further includes accessing metadata identifying a lens used to capture the digital image. The techniques further can be implemented such that determining a field of view further includes accessing metadata identifying a lens used to capture the digital image and determining a horizontal angle of view based on the lens.

In general, in another aspect, the techniques can be implemented as a computer program product, encoded on a computer-readable medium, operable to cause data processing apparatus to perform operations including accessing metadata associated with a digital image, the metadata identifying an image capture location, determining a depth of field corresponding to the digital image, identifying one or more points of interest located within the determined depth of field, selecting one of the one or more identified points of interest as an image subject, and editing the metadata associated with the digital image to include data identifying the selected point of interest.

The techniques can be further operable to cause data processing apparatus to perform operations including converting the metadata identifying the image capture location into a Global Positioning System (GPS) coordinate format. Also, the techniques can be implemented to be further operable to cause data processing apparatus to perform operations including determining the depth of field based on metadata identifying a subject distance, a focal length, and an f-stop corresponding to the digital image. Additionally, the techniques can be implemented to be further operable to cause data processing apparatus to perform operations including selecting one of the one or more identified points of interest based on proximity to the image capture location.

The techniques can be further operable to cause data processing apparatus to perform operations including submitting a request specifying the image capture location and determined depth of field to a database including point of interest data and receiving a response from the database including one or more identified points of interest. Also, the techniques can be further operable to cause data processing apparatus to perform operations including accessing metadata associated with the digital image, the metadata identifying a compass heading and determining, based at least in part on the compass heading, a horizontal field of view corresponding to the digital image. Additionally, the techniques can be further operable to cause data processing apparatus to perform operations including excluding points of interest located outside of the determined horizontal field of view.

In general, in another aspect, the techniques can be implemented as a computer program product, encoded on a computer-readable medium, operable to cause data processing apparatus to perform operations including accessing metadata associated with a digital image, the metadata identifying an image capture location and a compass heading, determining a depth of field corresponding to the digital image, determining a field of view corresponding to the digital image based on the determined depth of field and the compass heading, identifying one or more points of interest located within the determined field of view, selecting one of the one or more identified points of interest as an image subject, and associating the selected point of interest with the digital image.

The techniques can be further operable to cause data processing apparatus to perform operations including accessing metadata identifying an orientation value corresponding to the digital image. Also, the techniques can be further operable to cause data processing apparatus to perform operations including determining a vertical angle of view based on the orientation value and adjusting the determined field of view in accordance with the determined vertical angle of view. Additionally, the techniques can be further operable to cause data processing apparatus to perform operations including submitting a query to a database of point of interest data, the query specifying the determined field of view and receiving, in response to the query, a set of one or more identified points of interest.

The techniques further can be operable to cause data processing apparatus to perform operations including excluding a point of interest from the set of one or more identified points of interest in response to identifying a blocking structure located between the image capture location and the point of interest. Also, the techniques can be further operable to cause data processing apparatus to perform operations including determining the depth of field in accordance with metadata identifying a subject distance, a focal length, and an f-stop corresponding to the digital image. Additionally, the techniques can be further operable to cause data processing apparatus to perform operations including determining the depth of field in accordance with metadata identifying a lens used to capture the digital image. Further, the techniques can be operable to cause data processing apparatus to perform operations including accessing metadata identifying a lens used to capture the digital image, determining a horizontal angle of view based on the lens, and adjusting the field of view in accordance with the determined horizontal angle of view.

In general, in another aspect, the techniques can be implemented as a system including an image capture device including a compass and a memory device, the memory device tangibly storing at least one digital image and corresponding metadata and a computing system communicatively coupled to the image capture device, the computing system including processor electronics configured to perform operations including accessing the metadata corresponding to the digital image, the metadata identifying an image capture location and a compass heading, determining a depth of field corresponding to the digital image, determining a field of view corresponding to the digital image based on the determined depth of field and the compass heading, identifying one or more points of interest located within the determined field of view, selecting one of the one or more identified points of interest as an image subject, and associating the selected point of interest with the digital image.

The techniques described in this specification can be implemented to realize one or more of the following advantages. For example, the techniques can be implemented such that the location of a captured image can be used to automatically identify a set of one or more candidate points of interest that could have been included in the captured image. For example, one or more points of interest can be selected from a database in accordance with the location of the captured image. The techniques also can be implemented to permit determining a field of view of the image capture device based on either of both of the focal distance and the lens used to capture the image. Further, the techniques can be implemented to determine or narrow the set of candidate points of interest based on the determined field of view.

The techniques also can be implemented to narrow the set of candidate points of interest based on image metadata describing properties of an image, including one or more of a compass bearing, an accelerometer reading, and an altitude. For instance, a compass bearing can be used to narrow the determined field of view to a particular direction. Further, obstructions and topography can be used to narrow set of candidate points of interest for an image. For instance, the database of candidate points of interest can include data indicating the existence of blocking structures or topographical features that would obscure the view of a point of interest from one or more directions. Additionally, the techniques can be implemented to permit editing the metadata associated with an image to store an identified point of interest.

The details of one or more implementations are set forth in the accompanying drawings and the description below. Other features and advantages will be apparent from the description and drawings, and from the claims.

BRIEF DESCRIPTION OF THE DRAWINGS

Like reference symbols indicate like elements throughout the specification and drawings.

DETAILED DESCRIPTION

Figure 1:
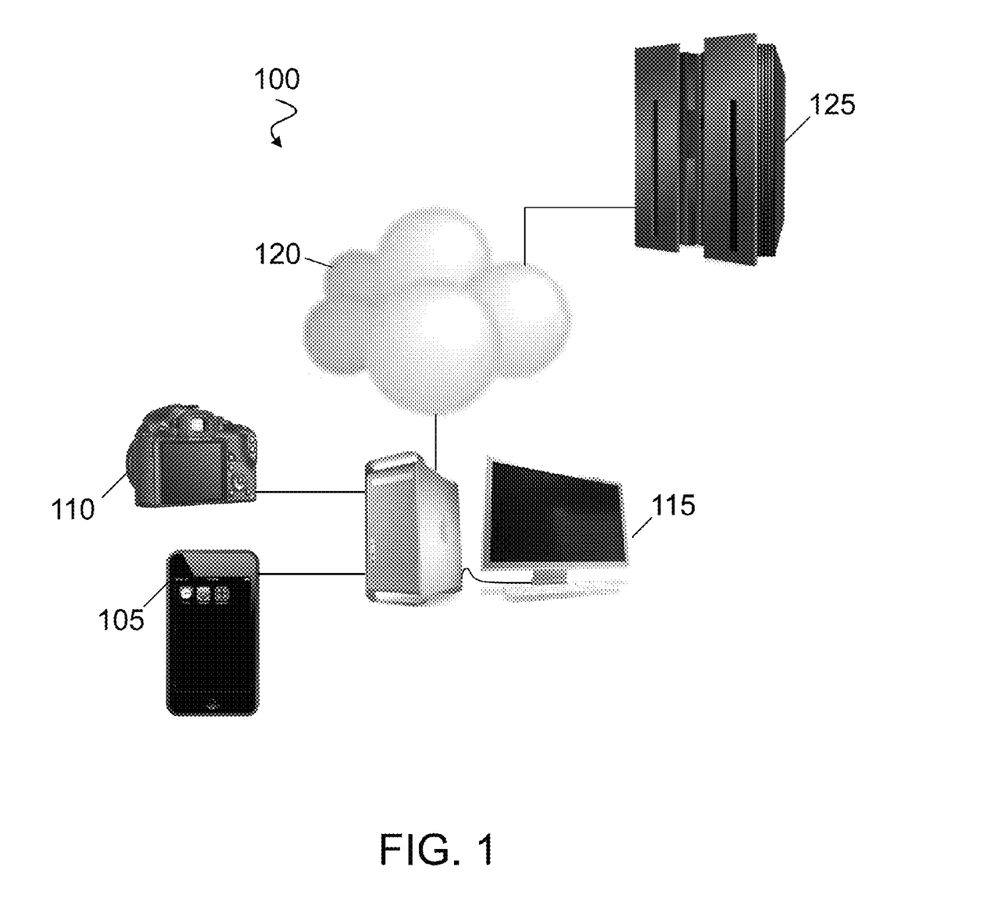
FIG. 1 shows an exemplary computing environment that includes image capture devices.

FIG. 1 shows an exemplary computing environment that includes image capture devices, a user station, and a server. A mobile computing device 105 that includes a camera can be used in computing environment 100 as an image capture device. Mobile computing device 105 can, through the camera, capture images and store them in memory, which can include an internal storage structure and optionally removable storage media. The removable storage media can be any form of nonvolatile memory, including flash memory sticks and secure digital (SD) memory cards. The captured images can be stored as files and further can include one or more items of associated metadata. The image metadata can be stored in any format, including Exif or IPTC.

Further, mobile computing device 105 can include hardware, firmware, and software applications configured to perform additional functions, such as transmitting and receiving telephonic and/or data communications over a wireless network. Mobile computing device 105 also can include one or more communications interfaces for communicating with other computing devices. For example, a communications interface can be used to facilitate data transfer with user station 115. The communications interfaces can be wireless, e.g. radio frequency or infrared, or wired, e.g. universal serial bus (USB) or IEEE 1394. In some implementations, mobile computing device 105 can be an iPhone manufactured by Apple Inc. of Cupertino, Calif.

A digital camera 110 also can be included in the computing environment 100. Digital camera 110 can be configured to capture and store images in memory, which can include an internal storage structure and optionally removable storage media. The captured images can be stored as files and further can include one or more items of associated metadata. The image metadata can be stored in any format, including Exif or IPTC. Also, digital camera 110 can include one or more wired or wireless communications interfaces for communicating with other devices. A communications interface can be used to facilitate data transfer with user station 115.

Mobile computing device 105 and digital camera 110, the image capture devices, also can include one or more of a navigation unit, a compass, and an accelerometer. The navigation unit can be configured to determine a geographic location of the image capture device. Further, the navigation unit can provide the determined geographic location to the device so that it can be recorded as an item of metadata associated with a corresponding captured image. In some implementations, the navigation unit can be a GPS processor, which can generate geographic coordinates corresponding to the device's location. The geographic coordinates can represent a latitude and longitude of the device. Optionally, the geographic coordinates can include an altitude value. In some other implementations, the navigation unit can be configured to determine the device's location based on other measures. For instance, the navigation unit can use cellular triangulation or proximity to a Wi-Fi access point to determine the device's location.

The compass can provide a heading indicating the direction in which the device or a particular portion of the device, e.g. the lens, is pointing. When an image is captured, the compass can provide the current heading to the device so that the heading can be recorded as an item of metadata associated with the captured image. Additionally, the accelerometer can provide data indicating the orientation of the device, such as a degree of tilt in one or more dimensions. When an image is captured, the accelerometer can provide orientation data to the device so that it can be recorded as an item of metadata associated with the captured image.

User station 115 can be any computing device that can be configured to communicate with either or both of mobile computing device 105 and digital camera 110, and to execute a landmark identification application configured to perform the functions described below. For example, user station 115 can be a general-purpose computing device, such as a desktop, laptop or workstation, or a specific-purpose computing device, such as a media appliance. User station 115 can include input components through which one or more inputs can be received. For example, the input components can include one or more of a keyboard, a mouse, a joystick, a trackball, a touch pad, a touch screen, and a microphone. Output components also can be associated with user station 115, including one or more of a display, one or more speakers, and a haptic interface.

User station 115 further can include a network connection to a communication network 120. The network connection can be implemented through a wired or wireless interface, and can support bi-directional communication between user station 115 and one or more other computing devices over communication network 120. Further, communication network 120 can be a public network, a private network, or a combination thereof, having any number of wired and/or wireless segments.

User station 115 can receive image file data from either or both of mobile computing device 105 and digital camera 110. In some implementations, image files can be transferred or copied to user station 115. In other implementations, user station 115 can read image file data directly from storage in mobile computing device 105 or digital camera 110.

A landmark identification application can be executed by user station 115 to identify a point of interest, e.g. a landmark, pictured in an image. Metadata indicating the location at which the image was captured can be provided to the landmark identification application, which can generate a set of one or more candidate points of interest that are within a specified distance of the location at which the image was captured. The specified distance can be a predetermined default value or can be calculated based on one or more items of image metadata, such as a focal length value or the type of lens used to capture the image.

In some implementations, the set of candidate points can be generated from a landmark database local to user station 115. For example, the landmark database can be installed from physical media, e.g. a CD-ROM or DVD, or downloaded from a remote device, such as server 125. In some other implementations, the landmark identification application can cause user station 115 to transmit a request for points of interest to a landmark database hosted on a remote device, such as server 125. The request can specify the image capture location and optionally can include one or more other items of image metadata. Further, the image capture location can be translated into a different representation, such as a predetermined coordinate system, before being included in the request.

Additional image metadata also can be used to narrow the set of candidate points of interest. For instance, image metadata identifying one or more of the focal distance and lens used to capture the image, a compass heading associated with the image, and an accelerometer reading indicating the orientation of the image capture device can be used to further define the field of view of the image capture device at the time the image was captured. In some implementations, focus point metadata can be associated with an image. The focus point metadata can indicate a location or point within the image on which the camera was focused when the image was captured. The focus point metadata can be used to more accurately determine a point of interest within a field of view, especially in situations in which multiple points of interest may be located within close relative proximity to each other. After a point of interest has been determined to be associated with an image, the landmark identification application can edit the metadata corresponding to the image to include the point of interest.

Figure 2:
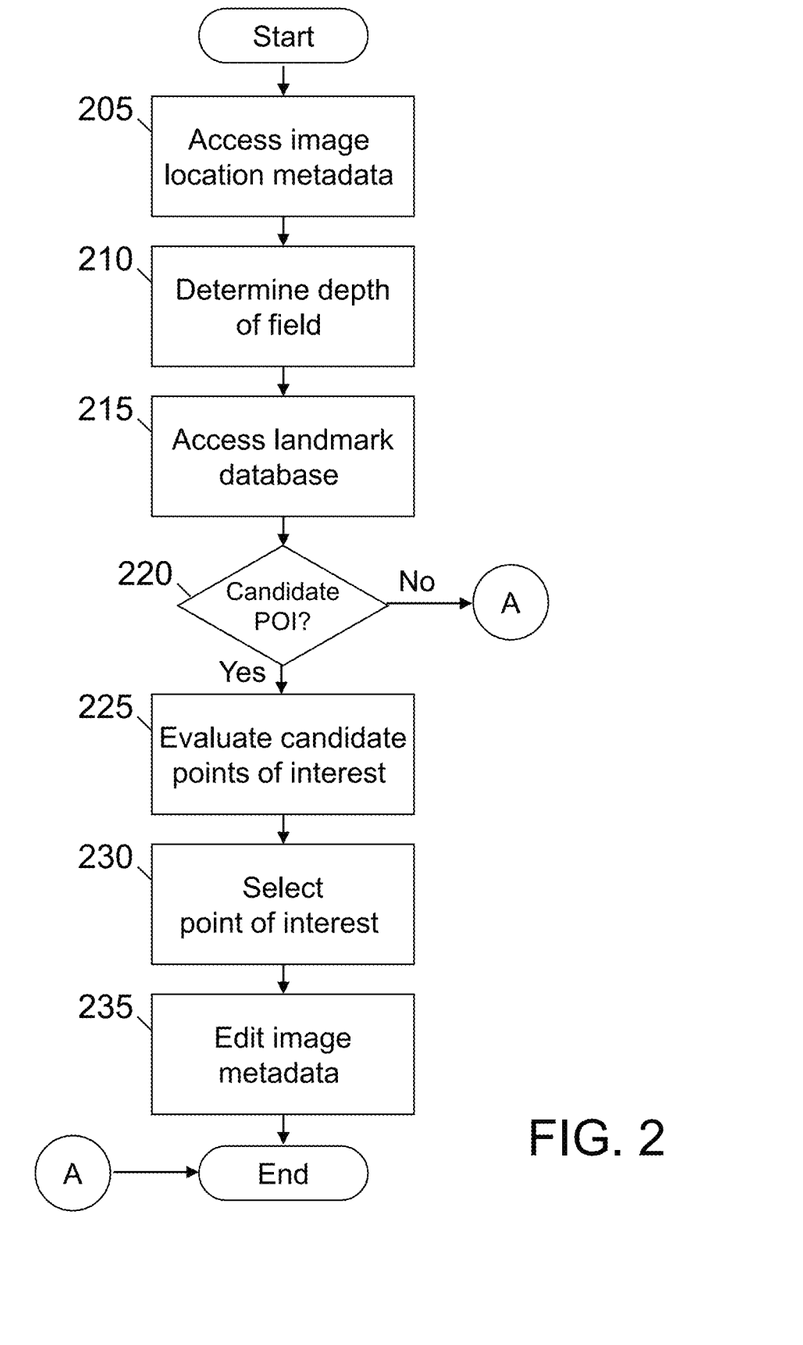
FIG. 2 shows an exemplary flowchart of a process for determining a point of interest associated with an image.

FIG. 2 shows an exemplary flowchart of a process for determining a point of interest associated with an image. The point of interest can be a landmark, natural or man-made, or other such object that has an identifiable geographic location. In some implementations, time/date metadata also can be evaluated in determining a point of interest. For example, a point of interest can be associated with a geographic location for a specified period of time, such as after a beginning date/time or until an ending date/time.

A captured image can be selected for point of interest processing manually or automatically. For instance, a directory of images can be processed automatically upon receipt by the processing device to determine whether a point of interest can be associated with an image. Image location metadata associated with a captured image can be accessed to determine the location at which the image was captured (205). The location metadata can be expressed as GPS coordinates or using any other coordinate system, such as Cartesian coordinates. In some implementations, the location metadata can be converted to a different coordinate format for processing.

The depth of field also can be determined for the captured image (210). The depth of field represents the portion of the image in which objects appear sharp and in focus. Thus, the evaluation of points of interest corresponding to a captured image can be limited to the depth of field of the image. Image metadata identifying one or more parameters associated with the captured image can be accessed, including the camera or sensor used, the lens focal length, the subject distance, and the f-stop. For example, sensors having various crop factors (full frame, 1.3 crop, 1.5 crop, etc.) can be used, and the type of sensor used can affect the field of depth. Some image capture settings will result in a small depth of field. For instance, for an image captured using a lens with a focal length of 35 mm, a subject distance of 10 feet, and an f-stop of 4, the near limit of the depth of field will equal 7 feet, 8 inches and the far limit will equal 14 feet, 2 inches. Thus, the depth of field for the captured image will equal 6 feet, 6 inches. Other image capture settings will result in a large depth of field. For instance, for an image captured using a lens with a focal length of 70 mm, a subject distance of 34 feet, and an f-stop of 16, the near limit will equal 16 feet, 11 inches and the far limit will be infinite. Thus, the depth of field for the captured image will be infinite.

If one or more items of metadata required to determine the depth of field are not available for a captured image, or if the depth of field ranges to infinity, a default value can be used for the far limit. The default value can be based on a general measure, such as distance to the horizon, on the topology and development of the particular location, or on the type of lens used to capture the image. Further, in some implementations, the near limit can be set to zero.

A landmark database can be accessed to identify any corresponding points of interest (215). The landmark database can be local to the computing system performing the point of interest processing, or can be hosted by a remote device. A request message or query specifying the image capture location and depth of field information can be submitted to the landmark database. If no indication of directionality is provided, the horizontal field of view of the image capture device is presumed to be 360 degrees. The landmark database can determine whether any stored points of interest correspond to the supplied location and depth of field information (220). In some implementations, the landmark database also can be configured to perform one or more validation functions concerning identified points of interest. For instance, it can be determined whether the view of a point of interest from the image capture location is obscured, such as by a blocking structure or the topography. If a point of interest is partially obscured or cannot be viewed from the image capture location, the point of interest can be excluded. If no points of interest are identified, a null set can be returned and the point of interest processing for the image can be terminated.

If one or more points of interest are identified by the landmark database, the set of candidate points of interest can be evaluated (225). If the set includes multiple points of interest, one or more factors can be used to determine the point of interest most likely corresponding to the captured image. For instance, the proximity of the candidate points of interest to the image capture location can be evaluated and the closest point of interest can be identified. Further, the candidate points of interest can be evaluated based on relative popularity, and the most popular point of interest can be identified. If more than one factor is used for the evaluation, e.g. proximity and popularity, one or more of the factors can be weighted to reflect a relative importance. Based on the evaluation, or if only one point of interest is included in the set, a point of interest can be selected (230). Further, the metadata corresponding to the image can be edited to include an indication of the selected point of interest (235). For example, the name of the selected point of interest, e.g. Coit Tower, can be inserted into the image metadata.

Figure 3:
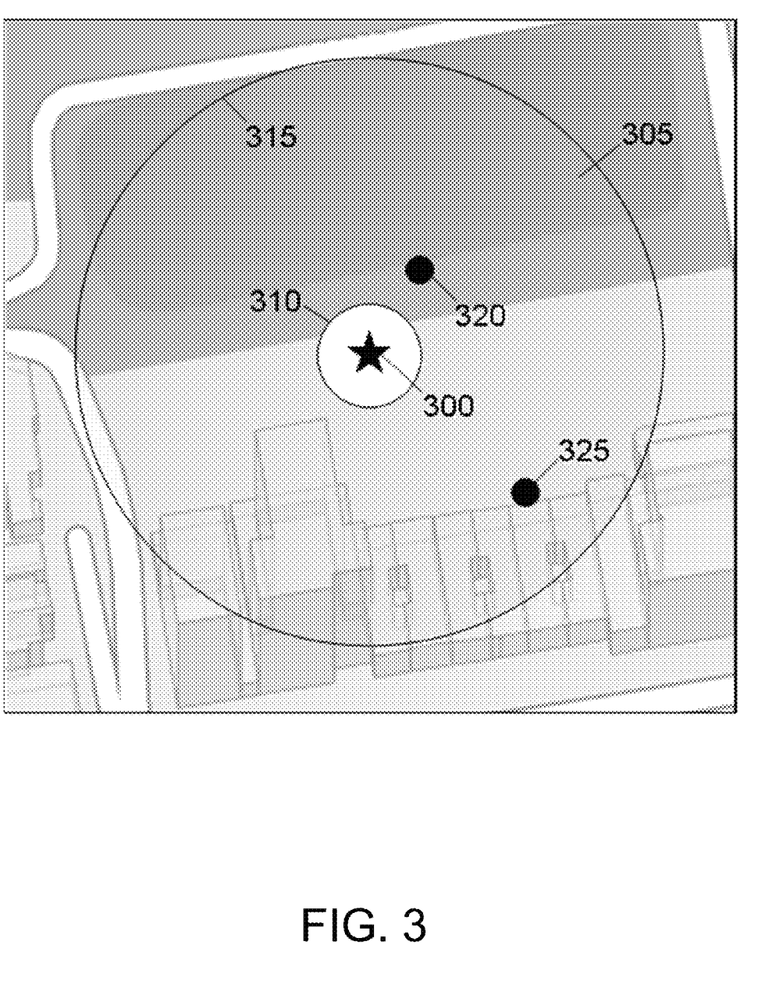
FIG. 3 shows an exemplary representation of a set of candidate points of interest corresponding to a captured image.

FIG. 3 shows an exemplary representation of a set of candidate points of interest corresponding to a captured image. Image capture location 300 can be represented as the center point of geographic area 305, which represents the depth of field corresponding to a captured image. Geographic area 305 can be defined with respect to near limit 310 of the depth of field and maximum distance 315. Near limit 310 can indicate the closest object in the field of view of the image capture device for which sharpness will be acceptable. Points of interest closer to image capture location 300 than near limit 310 will appear too blurry in the captured image and thus can be excluded.

Further, maximum distance 315 represents the far limit of acceptable sharpness. For some image capture device settings, an actual distance can be calculated for the far limit of acceptable sharpness. In such instances, maximum distance 315 can be set to equal the far limit. For other image capture device settings, the far limit of acceptable sharpness can be infinity. In such instances, the maximum distance 315 can be set to equal a predetermined default value corresponding to the maximum distance at which a point of interest will be considered to be included in a captured image. For example, maximum distance 315 can be set to equal a value representative of the distance to the horizon. Alternatively, maximum distance 315 can be set based on a geographic feature, such as topography or development.

Without additional metadata, such as an indication of directionality, geographic area 305 can be represented as a circle or "donut" centered on image capture location 300. Thus, the field of view of the image capture device is presumed to cover 360 degrees. Each point of interest located within geographic area 305, e.g. points of interest 320 and 325, can be included in the set of candidate points of interest. Thus, the set of candidate points of interest includes all of the points of interest that correspond to image capture location 300 based on the image capture parameters specified by the associated image metadata.

If the set of candidate points of interest is a null set, the analysis can be terminated. Similarly, if only one candidate point of interest is included in the set, the image metadata can be edited to identify that point of interest. Because the set of candidate points of interest includes both point of interest 320 and point of interest 325, one or more factors can be evaluated to select a single point of interest. In some implementations, proximity to image capture location 300 can be used as the determining factor. In such an implementation, the closest point of interest, point of interest 320, can be selected for association with the corresponding image. In some other implementations, a degree of popularity can be used to select a point of interest from the set of candidate points of interest. For instance, if point of interest 325 is photographed more frequently than point of interest 320, it can be selected for association with the corresponding image despite being located farther from image capture location 300. In still other implementations, two or more factors, e.g. proximity and popularity, can be evaluated in selecting a point of interest from the set of candidate points of interest. Also, one or more of the factors can be weighted in accordance with the relative importance of the factor to the selection.

Figure 4:
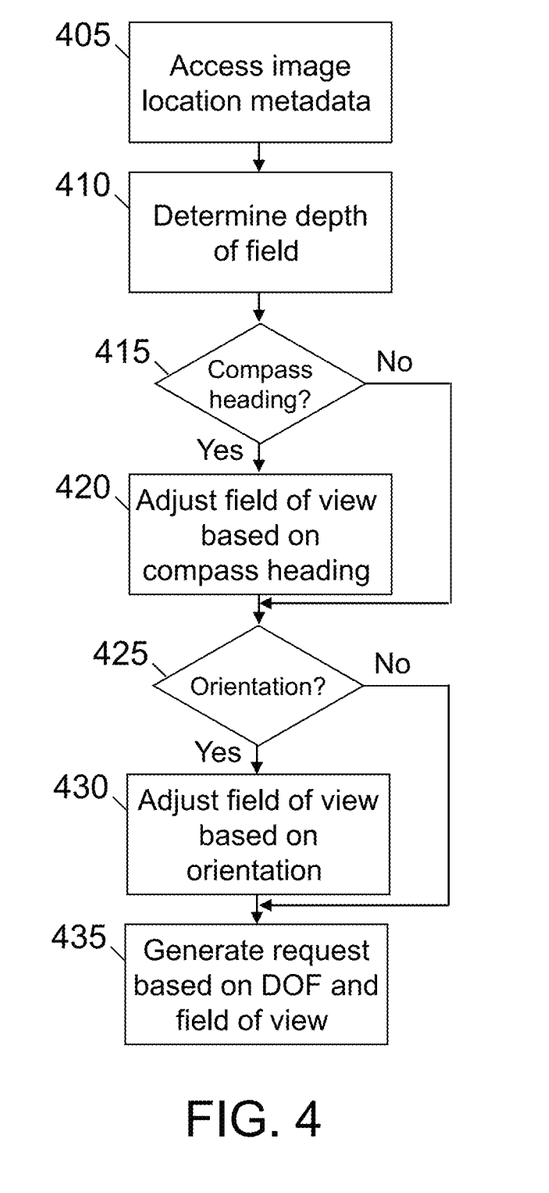
FIG. 4 shows an exemplary flowchart of a process for determining a field of view associated with an image based on either or both of a compass heading and an orientation.

FIG. 4 shows an exemplary flowchart of a process for determining a field of view associated with an image based on either or both of a compass heading and an orientation. The field of view can be determined as part of a point of interest processing operation, such as described with respect to FIG. 2. Image location metadata associated with a captured image can be accessed to determine the location at which the image was captured (405). The image location metadata can represent the geographic location using any format, including GPS coordinates. Further, the image location metadata can be converted to a different format for use in determining a point of interest. The depth of field corresponding to the captured image can be determined (410). As discussed above with respect to FIG. 2, the depth of field can be represented using either or both of a near limit and a far limit calculated based on one or more parameters and settings recorded in the image metadata. Alternatively, a default value can be used for either or both of the near limit and the far limit, such as when the image metadata is incomplete. A 360 degree horizontal field of view can be initially presumed for the image capture device.

Further, the image metadata can be accessed to determine whether a compass heading corresponding to the captured image is specified (415). If no compass heading is specified, it can be determined whether the metadata specifies an orientation (425). However, if a compass heading is specified, the horizontal field of view can be adjusted (420). The angular field of view (or "angle of view") indicates the portion of a scene that can be captured. The horizontal angle of view can be calculated based on the horizontal dimension of the sensor or film (h) and the focal length of the lens (f) using the equation: $angle_h=2\arctan h/2f$.

Alternatively, a default horizontal angle of view can be selected based on the type of lens used. For example, in some implementations, the horizontal angle of view can be set to 180 degrees for an ultra-wide angle lens, 100 degrees for a wide angle lens, 50 degrees for a standard lens, 15 degrees for a telephoto lens, and 8 degrees for a super telephoto lens. Further, if the lens used to capture the image is not identified by the image metadata, a standard horizontal angle of view can be used, such as 50 degrees.

The field of view corresponding to the captured image can be adjusted by centering the horizontal angle of view on the compass heading. For instance, if the horizontal angle of view is determined to be 40 degrees and the compass heading is 90 degrees, the determined field of view can be adjusted to the area between the near limit and the far limit corresponding to a compass heading of 70 degrees (compass heading−horizontal angle of view/2) and a compass heading of 110 degrees (compass heading−horizontal angle of view/2).

The image metadata also can be accessed to determine whether an orientation (or tilt) corresponding to the captured image is specified (425). If an orientation is not specified, a request for points of interest can be generated based on the determined field of view and depth of field (435). However, if an orientation is specified, the vertical field of view can be adjusted (430). In some implementations, the orientation can be expressed using the range −90 to +90 degrees, where −90 degrees indicates an orientation pointing directly down and +90 degrees indicates an orientation point directly up. Different formats for expressing orientation can be used in other implementations.

As with the horizontal angle of view, the vertical angle of view indicates the portion of a scene that can be captured. The vertical angle of view can be calculated based on the vertical dimension of the sensor or film (v) and the focal length of the lens (f) using the equation: $angle_v=2\arctan v/2f$. Alternatively, a default vertical angle of view can be selected based on the type of lens used. For example, in some implementations, the vertical angle of view can be set to 180 degrees for an ultra-wide angle lens, 90 degrees for a wide angle lens, 27 degrees for a standard lens, 19 degrees for a telephoto lens, and 5 degrees for a super telephoto lens. Further, if the lens used to capture the image is not identified by the image metadata, a standard vertical angle of view can be used, such as 50 degrees. In some implementations, a vertical angle of view can be determined using a gyroscope included within a mobile computing device. The gyroscope can determine the orientation of the mobile computing device in order to identify a vertical angle of view for an image captured by the mobile computing device.

The field of view corresponding to the captured image can be adjusted based on the orientation by centering the vertical angle of view on the angle of orientation. For instance, if the vertical angle of view is determined to be 40 degrees and the orientation is +30 degrees, the field of view can be limited in the vertical dimension to the area between the near limit and the far limit corresponding to between 10 and 50 degrees.

A request for points of interest can be generated specifying the determined depth of field and the field of view, as adjusted based on the compass heading and orientation operations (435). As described with respect to FIG. 2, the request can be submitted to a database of points of interest, such as a landmark database, and any stored points of interest corresponding to the request can be returned as a set of candidate points of interest. The returned set of candidate points of interest further can be processed as described with respect to FIG. 2.

Figure 5:
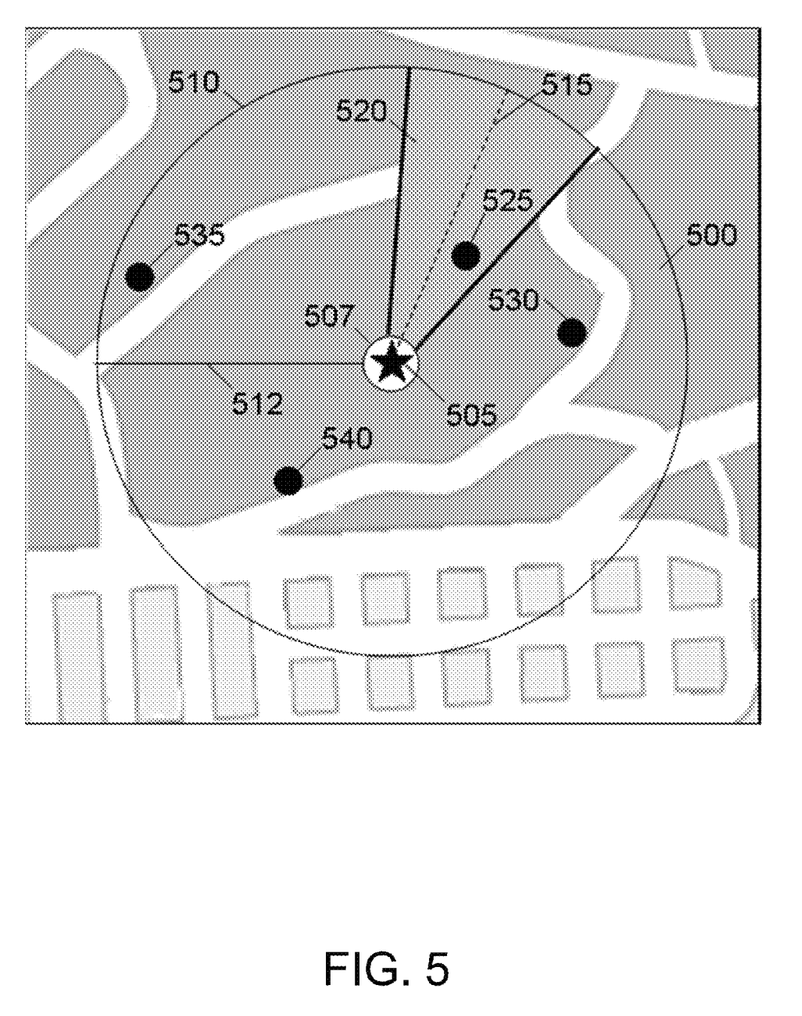
FIG. 5 shows an exemplary representation of the field of view defined in accordance with a compass heading associated with a captured image.

FIG. 5 shows an exemplary representation of the field of view defined in accordance with a compass heading associated with a captured image. Image capture location 505 can be indicated as the center point of geographic area 500, which represents the depth of field 512 corresponding to the captured image. Geographic area 500 can be defined with respect to near limit 507 and maximum distance 510. As discussed above, for some image capture device settings, an actual distance can be calculated for the far limit of acceptable sharpness. In such instances, maximum distance 510 can be set to equal the far limit. For other image capture device settings, the far limit of acceptable sharpness can be infinity. In such instances, maximum distance 510 can be set to equal a predetermined default value corresponding to the maximum distance at which a point of interest will be considered to be included in a captured image.

Image metadata associated with the captured image also can include a compass heading 515, e.g. expressed in degrees. Compass heading 515 can be used to define the width of field of view 520 of the image capture device. For example, compass heading 515 can represent the center of the device's field of view 520 in the horizontal dimension. If the image metadata includes a property identifying the lens used to capture the image, the width of field of view 520 can be determined based on the identified lens. For example, the horizontal angle of view can be set to 180 degrees for an ultra-wide angle lens, 100 degrees for a wide angle lens, 50 degrees for a standard lens, 15 degrees for a telephoto lens, and 8 degrees for a super telephoto lens. Alternatively, if no lens is identified by the image metadata, a default horizontal angle of view can be used, such as 50 degrees. Field of view 520 thus can be determined to include only the portion of geographic area 500 covered by the horizontal angle of view of the lens, centered on compass heading 515.

Together with the determined depth of field, the field of view can define the portion of geographic area 500 that could be included in the captured image. Without reference to compass heading 515, a 360 degree horizontal field of view is presumed and geographic area 500 includes points of interest 525, 530, 535, and 540. However, when compass heading 515 is accounted for, only point of interest 525 is located within field of view 520. Thus, the image metadata can be edited to associate point of interest 525 with the captured image.

Further, if the field of view determined in accordance with a recorded compass heading includes multiple points of interest, one or more additional factors can be evaluated to select between the included points of interest. For example, the factors evaluated can include one or more of proximity of a point of interest to image capture location 505, the relative popularity of the points of interest, and blocking structures and/or topographical features that would obscure one or more points of interest from view of image capture location 505. Additionally, an altitude corresponding to the image capture device, e.g. based on GPS coordinate data, also can be considered in evaluating the effect of blocking structures and topographical features. For example, if the image is captured from a location with an elevation of 40 feet above ground level instead of at ground level, a blocking structure that would not obstruct the view from the higher elevation can be ignored. Alternatively, in some implementations, the image metadata can be edited to associate with the captured image two or more points of interest that are located within field of view 520.

Figure 6:
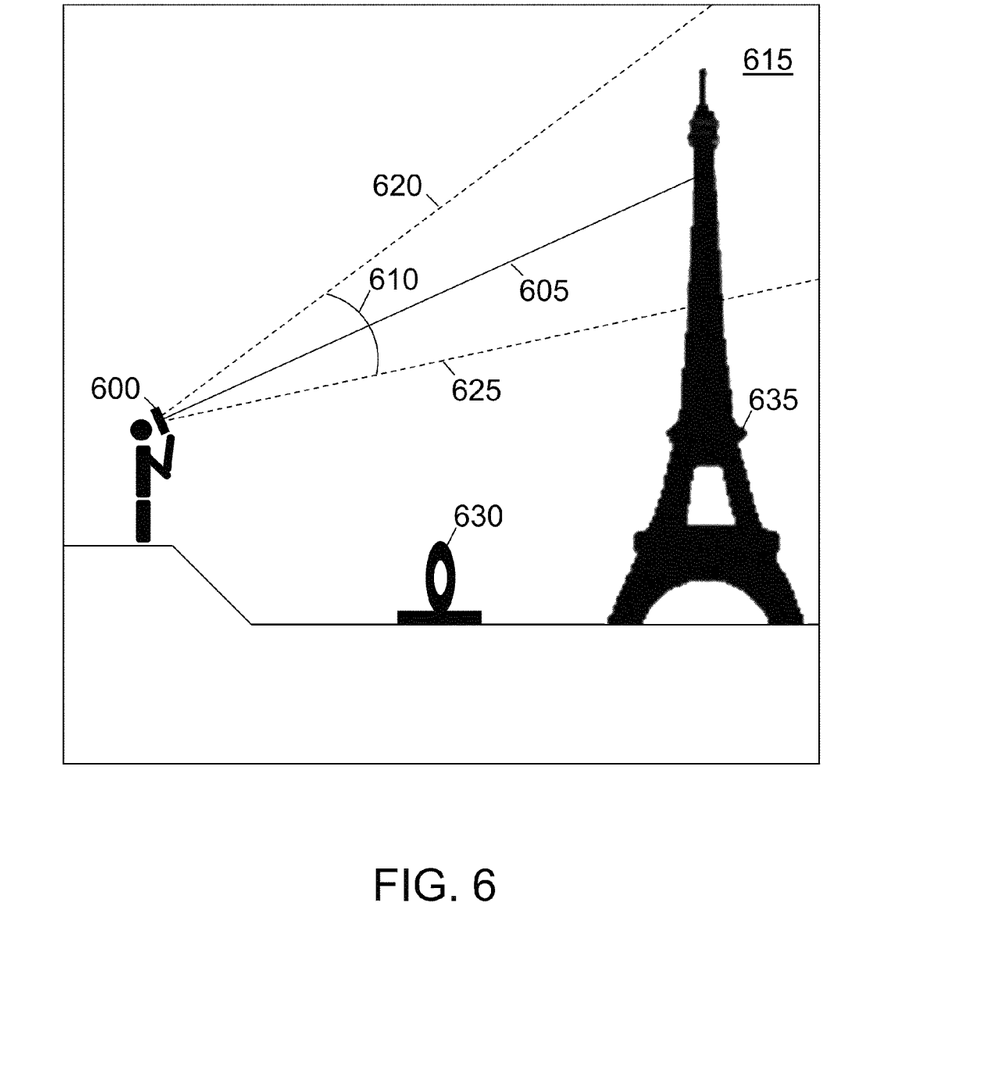
FIG. 6 shows an exemplary representation of the vertical field of view defined in accordance with an image capture device orientation.

FIG. 6 shows an exemplary representation of the vertical field of view defined in accordance with an image capture device orientation. Image capture device 600 can be angled vertically, up or down, when an image is captured. Further, image capture device 600 can include an accelerometer that is configured to provide a representative orientation value 605, such as a degree by which the lens is angled with respect to the horizontal plane. In some implementations, the image capture device 600 can include a gyroscope for identifying the representative orientation value 605, such as a vertical angle of view of the image capture device 600.

As discussed with respect to FIG. 4, a vertical angle of view 610 for a captured image can be calculated based on the vertical dimension of the sensor or film (v) and the focal length of the lens (f). Alternatively, a default value can be selected for vertical angle of view 610, such as based on the type of lens used to capture the image. By centering vertical angle of view 610 with respect to the vertical orientation indicated by orientation value 605, the vertical field of view 615 can be determined. Vertical field of view 615 represents the portion of a scene that can be captured based on the configuration of image capture device 600. For example, vertical field of view 615 can be illustrated by upper vertical limit 620 and lower vertical limit 625.

An object that is not included within vertical field of view 615 cannot be included in a corresponding captured image. Thus, one or more candidate points of interest can be eliminated from a set based on the determined vertical field of view 615. For example, a set of candidate points of interest can include a sculpture 630 and the Eiffel Tower 635. By determining vertical field of view 615, it can be established that only the Eiffel Tower 635 can be included in the captured image. Thus, the candidate point of interest corresponding to sculpture 630 can be excluded and the image metadata can be edited to associate the Eiffel Tower 635 with the captured image.

The techniques and functional operations described in this disclosure can be implemented in digital electronic circuitry, or in computer software, firmware, or hardware, including the structural means described in this disclosure and structural equivalents thereof, or in combinations of them. The techniques can be implemented using one or more computer program products, e.g., machine-readable instructions tangibly stored on computer-readable media, for execution by, or to control the operation of one or more programmable processors or computers. Further, programmable processors and computers can be included in or packaged as mobile devices.

The processes and logic flows described in this disclosure can be performed by one or more programmable processors executing one or more instructions to receive, manipulate, and/or output data. The processes and logic flows also can be performed by programmable logic circuitry, including one or more FPGAs (field programmable gate array), PLDs (programmable logic devices), and/or ASICs (application-specific integrated circuit). General and/or special purpose processors, including processors of any kind of digital computer, can be used to execute computer programs and other programmed instructions stored in computer-readable media, including nonvolatile memory, such as read-only memory, volatile memory, such as random access memory, or both. Additionally, data and computer programs can be received from and transferred to one or more mass storage devices, including hard drives, flash drives, and optical storage devices. Further, general and special purpose computing devices and storage devices can be interconnected through communications networks. The communications networks can include wired and wireless infrastructure. The communications networks further can be public, private, or a combination thereof.

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method of associating a point of interest with a captured image, the method comprising:
   accessing metadata associated with a digital image, the metadata identifying an image capture location;
   determining a depth of field corresponding to the digital image;
   identifying a plurality of points of interest located within the determined depth of field;
   selecting one of the plurality of identified points of interest as an image subject based, at least in part, on a proximity of each of the plurality of identified points of interest to the image capture location; and
   editing the metadata associated with the digital image to include data identifying the selected point of interest.

2. The computer-implemented method of claim 1, wherein the metadata identifying an image capture location includes a Global Positioning System (GPS) coordinate.

3. The computer-implemented method of claim 1, wherein determining a depth of field comprises:
   accessing metadata identifying a subject distance, a focal length, and an f-stop corresponding to the digital image.

4. The computer-implemented method of claim 3, wherein determining a depth of field further comprises:
   accessing metadata identifying a sensor type corresponding to the digital image.

5. The computer-implemented method of claim 1, wherein identifying a plurality of points of interest comprises:
   submitting a request specifying the image capture location and determined depth of field to a database including point of interest data; and
   receiving a response from the database including the plurality of points of interest.

6. The computer-implemented method of claim 1, further comprising:
   accessing metadata associated with the digital image, the metadata identifying a compass heading; and
   determining, based at least in part on the compass heading, a horizontal field of view corresponding to the digital image.

7. The computer-implemented method of claim 6, wherein identifying a plurality of points of interest further comprises:
   excluding points of interest located outside of the determined horizontal field of view from the plurality of identified points of interest.

8. A computer-implemented method of associating a point of interest with a captured image, the method comprising:
   accessing metadata associated with a digital image, the metadata identifying an image capture location and a compass heading;

determining a depth of field corresponding to the digital image;
determining a field of view corresponding to the digital image based on the determined depth of field and the compass heading;
identifying a plurality of points of interest located within the determined field of view;
selecting one of the plurality of identified points of interest as an image subject based, at least in part, on a proximity of each of the plurality of identified points of interest to the image capture location; and
associating the selected point of interest with the digital image.

9. The computer-implemented method of claim 8, further comprising:
accessing metadata identifying an orientation value corresponding to the digital image.

10. The computer-implemented method of claim 9, wherein determining a field of view further comprises:
determining a vertical angle of view based on the orientation value; and
adjusting the determined field of view in accordance with the determined vertical angle of view.

11. The computer-implemented method of claim 9, wherein the orientation value is captured using a gyroscope.

12. The computer-implemented method of claim 8, further comprising:
accessing metadata identifying a focus point value corresponding to the digital image.

13. The computer-implemented method of claim 8, wherein identifying points of interest further comprises:
submitting a query to a database of point of interest data, the query specifying the determined field of view; and
receiving, in response to the query, the plurality of identified points of interest.

14. The computer-implemented method of claim 13, further comprising:
excluding a point of interest from the plurality of identified points of interest in response to identifying a blocking structure located between the image capture location and the point of interest.

15. The computer-implemented method of claim 8, wherein determining a depth of field comprises:
accessing metadata identifying a subject distance, a focal length, and an f-stop corresponding to the digital image.

16. The computer-implemented method of claim 8, wherein determining a depth of field comprises:
accessing metadata identifying a lens used to capture the digital image.

17. The computer-implemented method of claim 8, wherein determining a field of view comprises:
accessing metadata identifying a lens used to capture the digital image; and
determining a horizontal angle of view based on the lens.

18. A computer program product, encoded on a non-transitory computer-readable medium, operable to cause data processing apparatus to perform operations comprising:
accessing metadata associated with a digital image, the metadata identifying an image capture location;
determining a depth of field corresponding to the digital image;
identifying a plurality of points of interest located within the determined depth of field;
selecting one of the plurality of identified points of interest as an image subject based, at least in part, on a proximity of each of the plurality of identified points of interest to the image capture location; and
editing the metadata associated with the digital image to include data identifying the selected point of interest.

19. The computer program product of claim 18, further operable to cause data processing apparatus to perform operations comprising:
converting the metadata identifying the image capture location into a Global Positioning System (GPS) coordinate format.

20. The computer program product of claim 18, further operable to cause data processing apparatus to perform operations comprising:
determining the depth of field based on metadata identifying a subject distance, a focal length, and an f-stop corresponding to the digital image.

21. The computer program product of claim 18, further operable to cause data processing apparatus to perform operations comprising:
submitting a request specifying the image capture location and determined depth of field to a database including point of interest data; and
receiving a response from the database including the plurality of identified points of interest.

22. The computer program product of claim 18, further operable to cause data processing apparatus to perform operations comprising:
accessing metadata associated with the digital image, the metadata identifying a compass heading; and
determining, based at least in part on the compass heading, a horizontal field of view corresponding to the digital image.

23. The computer program product of claim 22, further operable to cause data processing apparatus to perform operations comprising:
excluding points of interest located outside of the determined horizontal field of view from the plurality of identified points of interest.

24. A computer program product, encoded on a non-transitory computer-readable medium, operable to cause data processing apparatus to perform operations comprising:
accessing metadata associated with a digital image, the metadata identifying an image capture location and a compass heading;
determining a depth of field corresponding to the digital image;
determining a field of view corresponding to the digital image based on the determined depth of field and the compass heading;
identifying a plurality of points of interest located within the determined field of view;
selecting one of the plurality of identified points of interest as an image subject based, at least in part, on a proximity of each of the plurality of identified points of interest to the image capture location; and
associating the selected point of interest with the digital image.

25. The computer program product of claim 24, further operable to cause data processing apparatus to perform operations comprising:
accessing metadata identifying an orientation value corresponding to the digital image.

26. The computer program product of claim 25, further operable to cause data processing apparatus to perform operations comprising:
determining a vertical angle of view based on the orientation value; and
adjusting the determined field of view in accordance with the determined vertical angle of view.

27. The computer program product of claim 24, further operable to cause data processing apparatus to perform operations comprising:
  submitting a query to a database of point of interest data, the query specifying the determined field of view; and
  receiving, in response to the query, the plurality of points of interest.

28. The computer program product of claim 27, further operable to cause data processing apparatus to perform operations comprising:
  excluding a point of interest from the plurality of identified points of interest in response to identifying a blocking structure located between the image capture location and the point of interest.

29. The computer program product of claim 24, further operable to cause data processing apparatus to perform operations comprising:
  determining the depth of field in accordance with metadata identifying a subject distance, a focal length, and an f-stop corresponding to the digital image.

30. The computer program product of claim 24, further operable to cause data processing apparatus to perform operations comprising:
  determining the depth of field in accordance with metadata identifying a lens used to capture the digital image.

31. The computer program product of claim 24, further operable to cause data processing apparatus to perform operations comprising:
  accessing metadata identifying a lens used to capture the digital image;
  determining a horizontal angle of view based on the lens; and
  adjusting the field of view in accordance with the determined horizontal angle of view.

32. A system comprising:
  an image capture device including a compass and a memory device, the memory device tangibly storing at least one digital image and corresponding metadata; and
  a computing system communicatively coupled to the image capture device, the computing system including processor electronics configured to perform operations comprising:
    accessing the metadata corresponding to the digital image, the metadata identifying an image capture location and a compass heading;
    determining a depth of field corresponding to the digital image;
    determining a field of view corresponding to the digital image based on the determined depth of field and the compass heading;
    identifying a plurality of points of interest located within the determined field of view;
    selecting one of the plurality of identified points of interest as an image subject based, at least in part, on a proximity of each of the plurality of identified points of interest to the image capture location; and
    associating the selected point of interest with the digital image.

* * * * *